United States Patent
Devouge

(10) Patent No.: US 8,759,682 B2
(45) Date of Patent: Jun. 24, 2014

(54) DEVICE FOR HOLDING AT LEAST ONE LONGITUDINAL ELEMENT, OF THE WIRING HARNESS OR TUBE TYPE, ON A SUPPORT

(75) Inventor: Laurent Devouge, Margut (FR)

(73) Assignee: Amphenol Air LB, Blagny (FR)

( * ) Notice: Subject to any disclaimer, the term of this patent is extended or adjusted under 35 U.S.C. 154(b) by 0 days.

(21) Appl. No.: 13/333,067

(22) Filed: Dec. 21, 2011

(65) Prior Publication Data

US 2012/0160540 A1 Jun. 28, 2012

(30) Foreign Application Priority Data

Dec. 23, 2010 (FR) ...................................... 10 61207

(51) Int. Cl.
*H01B 17/00* (2006.01)

(52) U.S. Cl.
USPC ...... 174/135; 174/40 CC; 174/665; 248/74.1; 248/74.3; 248/74.2

(58) Field of Classification Search
USPC .......... 174/40 CC, 650, 652, 68.1, 68.3, 135, 174/72 R, 72 A, 40 R, 153 G, 152 R, 152 G, 174/665; 248/74.3, 74.1, 74.5, 68.1, 49, 248/74.2, 63
See application file for complete search history.

(56) References Cited

U.S. PATENT DOCUMENTS

| | | | | |
|---|---|---|---|---|
| 3,584,888 A | * | 6/1971 | Lott | 174/153 G |
| 3,906,592 A | * | 9/1975 | Sakasegawa et al. | 248/68.1 |
| 3,916,488 A | * | 11/1975 | Gazda et al. | 248/74.3 |
| 4,248,459 A | * | 2/1981 | Pate et al. | 174/72 R |
| 4,360,177 A | * | 11/1982 | Dulhunty | 174/40 R |
| 4,535,960 A | * | 8/1985 | Downing et al. | 248/68.1 |
| H0000968 H | * | 10/1991 | Moyles | 248/74.5 |
| 6,443,403 B1 | * | 9/2002 | Page et al. | 248/68.1 |
| 6,508,442 B1 | * | 1/2003 | Dolez | 248/74.1 |
| 6,732,982 B1 | * | 5/2004 | Messinger | 248/74.1 |

FOREIGN PATENT DOCUMENTS

DE 19509349 7/1996
EP 0791997 8/1997

OTHER PUBLICATIONS

Thornwood "Soft Cable Retainer With Snap-In Feature" IBM Technical Disclosure Bulletin, vol. 32, No. 11, pp. 31-32, Apr. 1, 1990.
French Search Report for French Patent Application No. FR 746542 issued May 11, 2011.

* cited by examiner

*Primary Examiner* — Angel R Estrada
(74) *Attorney, Agent, or Firm* — Meyertons, Hood, Kivlin, Kowert & Goetzel, P.C.; Eric B. Meyertons

(57) ABSTRACT

This device for holding at least one longitudinal element, of the wiring harness or tube type, on a support, comprises a deformable clamp that allows said longitudinal element to be inserted into the clamp and holds the longitudinal element, and a protective layer that at least partially covers the clamp. The clamp is made of thermoplastic, the protective layer being overmolded onto the clamp.

5 Claims, 1 Drawing Sheet

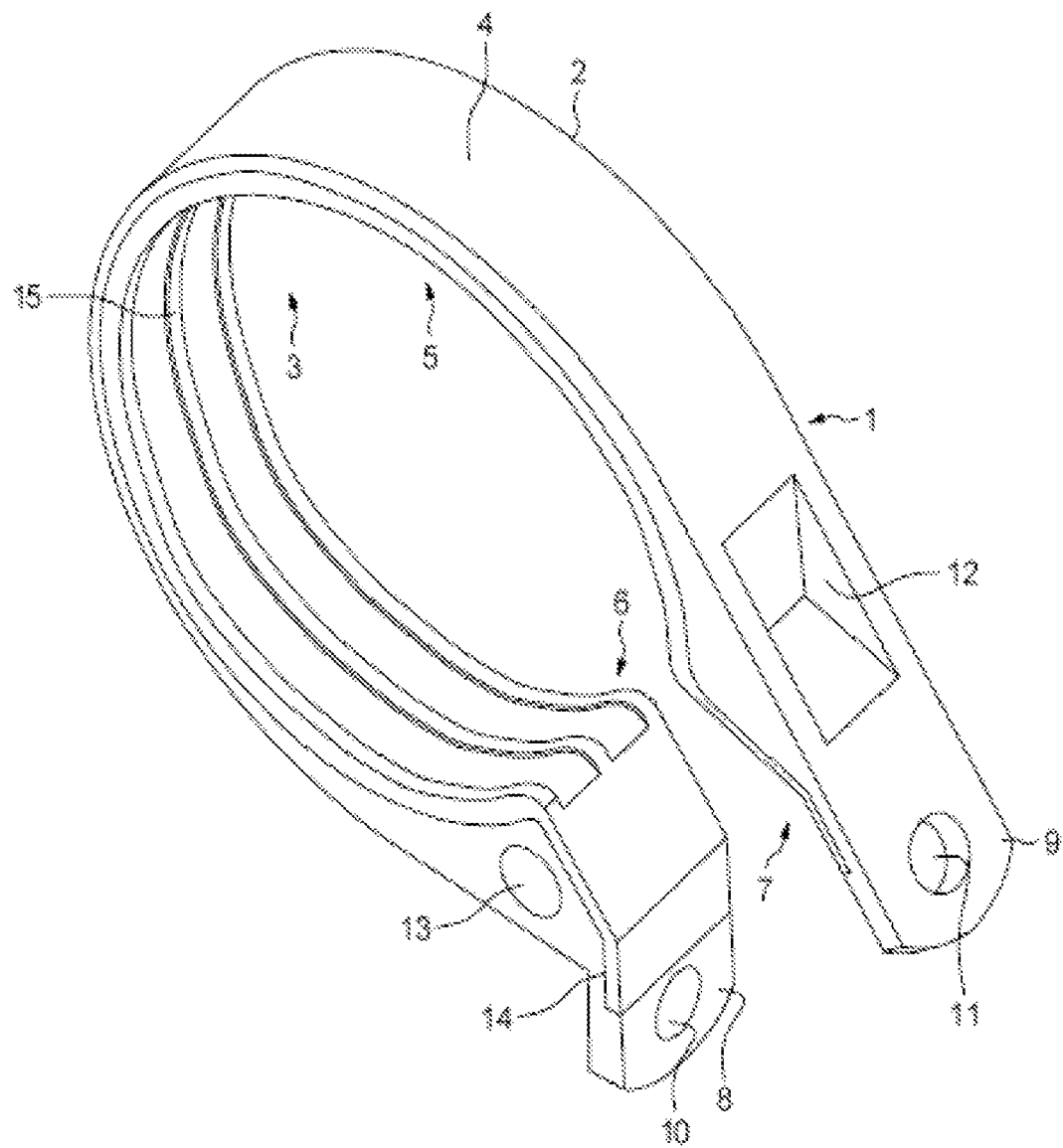

DEVICE FOR HOLDING AT LEAST ONE LONGITUDINAL ELEMENT, OF THE WIRING HARNESS OR TUBE TYPE, ON A SUPPORT

BACKGROUND OF THE INVENTION

1. Field of the Invention

The invention relates in general to wiring clamps and relates more specifically to a device for holding a wiring harness or a tube on a support.

2. Description of the Relevant Art

One particularly advantageous application of such a device is in holding a wiring harness or a tube on the internal structure of an aircraft or in any other sphere of industry.

However, the invention relates in general to the attachment of a bundle of longitudinal elements or of a tube to a structure.

As is known, in the field of aeronautical wiring, a great many clamps are likely to be used to hold all the wiring harnesses of an aircraft on-board network. Since weight savings are one of the constant concerns of equipment manufacturers working in the aeronautical field, this weight saving requirement is also felt in the field of wiring equipment and, in particular, in relation to the clamps that hold the wiring harnesses.

In the prior art, the devices for holding wiring harnesses are made using a metal clamp produced from a tab bent into the shape of a circular arc and surrounded by a silicone sleeve.

Making the clamp from a metal tab, although advantageous in terms of flexibility, does present a major disadvantage on account of its weight.

It has also been found that the silicone sleeve has a tendency to slide along the clamp and/or to slip off sideways and this firstly makes it less effective, in terms of its ability to hold the wiring, and secondly makes it liable, in the longer term, to damage the wiring harness.

SUMMARY OF THE INVENTION

It is therefore an object of the embodiments disclosed herein to alleviate this disadvantage and to provide a device for holding a wiring harness or a tube and, more generally, a longitudinal element or a bundle of longitudinal elements, that is of reduced weight and guarantees correct positioning of the protective layer.

In one embodiment, a device for holding at least one longitudinal element, of the wiring harness or tube type, on a support, includes a deformable clamp that allows said longitudinal element to be inserted into the clamp and holds the longitudinal element, and a protective layer that at least partially covers the clamp.

According to one general feature of this device, the clamp is made of thermoplastic, the protective layer being over-molded onto the clamp.

According to another feature of this device, the layer of protective material contains silicone.

For example, the clamp is made of polyetheretherketone (PEEK).

In one embodiment, the protective layer extends along the concave internal face of the clamp.

For example, the mutually opposite ends of the clamp are each provided with a tab provided with a hole for closing the clamp and attaching it to the structure. In this case the protective layer may extend over at least part of the mutually opposing faces of the tabs.

According to one embodiment, the protective layer may be grooved.

The clamp may further comprise, at the region of connection with the tabs, an increased thickness to avoid any risk of pinching a cable of the bunch between the tabs as the device is closed. In this case, recesses may be provided in the clamp at said region of connection. This then further reduces the mass of the clamp.

BRIEF DESCRIPTION OF THE DRAWINGS

Other objects, features and advantages of the invention will become apparent from reading the following description, given solely by way of non-limiting example, and made with reference to the attached drawing.

FIG. 1 illustrates a perspective view of a device for holding a wiring harness according to the invention.

While the invention may be susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF THE PREFERRED EMBODIMENTS

The device for holding a wiring harness which has been illustrated in FIG. 1, denoted by the overall numerical reference 1, is intended here to hold a bunch of wires on the internal structure of an aircraft. However, it does not constitute a departure from the scope of the invention if the device is intended to attach any other type of longitudinal elements, particularly in the field of industry.

As may be seen in FIG. 1, this device 1 essentially consists of a clamp 2 comprising a partially annular region 3, which means to say an open region, having a convex external surface 4 and a concave internal surface 5 that actually does the holding of the wiring harness. The mutually facing ends 6 and 7 of the annular region 3 are extended by tabs 8 and 9, each provided with a hole 10 and 11.

It will be noted that the clamp 2 is made as a single piece out of injection moulded thermoplastic, for example polyetheretherketone, also known by the name of "PEEK". Such a thermoplastic is of relatively low weight by comparison with materials of the aluminum or stainless steel type used in the prior art. It is also readily capable of being deformed and of reverting to its initial position, as can be seen in the attached FIGURE.

The clamp 2 can thus be deformed between an open position that allows the wires to be inserted, and a closed position for holding the wires on the structure. It will be noted that, for preference, thanks to the fact that the clamp is made of Peek, this clamp can adopt a completely open, practically laid out flat, position allowing for ease of positioning of the bunch, while also reverting to its original position illustrated in the FIGURE. By choosing a clamp of suitable dimensions, in this position, the bunch can be held firmly before the clamp is closed up, thanks to the elastic force therefore applied to the bunch.

The clamp can then be closed up either by bringing the end tabs together and fixing them to the structure, for example using a screw, or using some other fixing system.

It would be noted in this regard that one of the tabs, namely the tab denoted by the reference 8, extends laterally with respect to the corresponding end of the annular part, while the other tab, namely the tab referenced 9, extends in the continuation of the opposite end of the annular part so that when the clamp is in the closed position the two tabs nest together.

To improve assembly and increase the rigidity of the clamp, in the region of connection between the annular part and the end tabs, the clamp has an increased thickness to prevent any risk of a wire of the bunch becoming trapped between the end tabs 8 and 9 as the device is closed. However, recesses such as 12 and 13 are also provided, these being located in this region of connection, in order to reduce the overall weight.

The device 1 is also provided with a protective layer covering the concave face of the clamp 2 and extending along a substantial part of the end tabs 8 and 9, for example as far as the holes 10 and 11.

An impression is thus provided, for example, along that face of the clamp that is intended to receive this protective layer.

Whereas the clamp 2 is made of thermoplastic, the protective layer 14 itself is made of silicone. What is meant here by silicone is a silicone containing polymer. The use of silicone, thanks to its elastic properties, allows for effective holding of the bunch. Further, the presence of this layer of silicone at the tabs prevents any risk of damage to the wires should they become trapped as the device is being closed up.

In order to achieve good cohesion between the silicone and the clamp 2, the silicone containing protective layer is produced by overmolding, making it possible to avoid any risk of the protective layer slipping off.

It has been found that the combined use of a clamp made of thermoplastic and of an overmolded protective layer made of silicone yielded a relatively significant weight saving of the order of 50% over the prior art. Indeed it was noted that a clamp intended for holding a 42 mm diameter wiring harness had a weight of the order of 10.5 g.

Finally, it will be noted that, with a view to making it easier to hold the wiring harness without immobilizing it, longitudinal ribs such as 15 are provided in the protective layer 14 at the time of overmolding.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. Device for holding a bundle of at least one longitudinal element, of the wiring harness type, on a support, comprising a deformable clamp that allows said longitudinal element to be inserted into the clamp and holds the longitudinal element, and a protective layer that at least partially covers the clamp, wherein the clamp is made of thermoplastic and in that the protective layer is overmolded onto the clamp, and in that the layer of protective material contains silicone, wherein the mutually opposite ends of the clamp are each provided with a tab, each tab comprising a hole for closing the clamp and attaching the clamp to the support, wherein the clamp comprises, at the region of connection with the tabs, an increased thickness and localized recesses at said region of connection.

2. Device according to claim 1, wherein the clamp is made of polyetheretherketone.

3. Device according to claim 1, wherein the protective layer extends along the concave internal face of the clamp.

4. Device according to claim 1, wherein the protective layer extends over at least part of the mutually opposing faces of the tabs.

5. Device according to claim 1, wherein the protective layer is ribbed.

* * * * *